US008648019B2

(12) United States Patent
Pol et al.

(10) Patent No.: US 8,648,019 B2
(45) Date of Patent: Feb. 11, 2014

(54) MATERIALS AS ADDITIVES FOR ADVANCED LUBRICATION

(75) Inventors: Vilas G. Pol, Naperville, IL (US); Michael M. Thackeray, Naperville, IL (US); Kuldeep Mistry, Darien, IL (US); Ali Erdemir, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 190 days.

(21) Appl. No.: 13/247,717

(22) Filed: Sep. 28, 2011

(65) Prior Publication Data

US 2013/0079262 A1    Mar. 28, 2013

(51) Int. Cl.
*C10M 169/04*    (2006.01)

(52) U.S. Cl.
USPC ........................................................ 508/113

(58) Field of Classification Search
USPC ........................................................ 508/113
See application file for complete search history.

(56) References Cited

U.S. PATENT DOCUMENTS

| | | | |
|---|---|---|---|
| 4,252,658 A * | 2/1981 | Tasaka et al. ................. | 508/131 |
| 5,344,635 A | 9/1994 | Bujard et al. | |
| 6,419,717 B2 | 7/2002 | Moy et al. | |
| 6,544,678 B2 | 4/2003 | Faris et al. | |
| 6,710,020 B2 | 3/2004 | Tenne et al. | |
| 6,828,282 B2 | 12/2004 | Moy et al. | |
| 7,060,390 B2 | 6/2006 | Chen et al. | |
| 7,211,351 B2 | 5/2007 | Klaassen | |
| 7,435,494 B1 | 10/2008 | Rogers et al. | |
| 7,449,432 B2 | 11/2008 | Lockwood et al. | |
| 2004/0265587 A1 | 12/2004 | Koyanagi et al. | |
| 2006/0057388 A1 | 3/2006 | Jin et al. | |
| 2006/0078726 A1 | 4/2006 | Antonio et al. | |
| 2006/0093885 A1 | 5/2006 | Krusic et al. | |
| 2007/0009800 A1 | 1/2007 | Barker et al. | |
| 2007/0099311 A1 | 5/2007 | Zhou et al. | |
| 2007/0100047 A1 | 5/2007 | Sukhadia et al. | |
| 2007/0118007 A1 | 5/2007 | Fong et al. | |
| 2007/0158609 A1 * | 7/2007 | Hong et al. .................... | 252/71 |
| 2007/0212583 A1 | 9/2007 | Johnson | |
| 2007/0240762 A1 | 10/2007 | Harris et al. | |
| 2008/0070087 A1 | 3/2008 | Johnson | |
| 2008/0221002 A1 * | 9/2008 | Oldfield et al. ............... | 508/463 |
| 2009/0033164 A1 | 2/2009 | Khan | |
| 2009/0117028 A1 | 5/2009 | Kundu | |
| 2010/0178232 A1 | 7/2010 | Pol et al. | |

OTHER PUBLICATIONS

Noriaki et al., Separated synthesis of iron-included carbon nanocapsules and nanotubes by pyrolysis of ferrocene in pure hydrogen, 2003, Carbon, 41, pp. 2159 to 2162.*

Pol, V.G. et al., Carbon Spherules: Synthesis, Properties and Mechanistic Elucidation, Carbon (2004) 42, 111-116.

(Continued)

*Primary Examiner* — Taiwo Oladapo
(74) *Attorney, Agent, or Firm* — Olson & Cepuritis, Ltd.

(57) ABSTRACT

This invention relates to carbon-based materials as anti-friction and anti-wear additives for advanced lubrication purposes. The materials have various shapes, sizes, and structures and are synthesized by autogenic reactions under extreme conditions of high temperature and pressure. The lubricant compositions comprise carbon-based particles suspended in a liquid hydrocarbon carrier. Optionally, the compositions further comprise a surfactant (e.g., to aid in dispersion of the carbon particles). Specifically, the novel lubricants have the ability to significantly lower friction and wear, which translates into improved fuel economies and longer durability of mechanical devices and engines.

6 Claims, 12 Drawing Sheets

(56) References Cited

OTHER PUBLICATIONS

Pol, V.G. et al., High Yield One-Step Synthesis of Carbon Spheres Produced by Dissociating Individual Hydrocarbons at their Autogenic Pressure at Low Temperatures, Carbon (2006) 44, 3285-3292.

Pol, V.G. et al., Catalyst-Free, One-Step Synthesis of Olivary-Shaped Carbon From Olive Oil, Ind. Eng. Chem. Res. (2009), 48, 5691-5695.

Pol, V.G. et al., Synthesis of Monodispersed Prolate Spheroid Shaped Paramagnetic Carbon, Carbon (2009) 47, 1050-1055.

Pol, V.G. et al., Implementation of an Electric Field (AC and DC) for the Growth of Carbon Filaments via Reaction under Autogenic Pressure at Elevated Temperatures of Mesitylene Without Catalyst or Solvent, Chem. Mater. (2006) 18, 1512-1519.

Pol, V.G. et al., Measurement of Autogenous Pressure and Dissociated Species During the Thermolysis of Mesitylene for the Synthesis of Monodispersed, Pure, Paramagnetic Carbon Particles, Ind. Eng. Chem. Res. (2009) 48, 1484-1489.

Pol, V.G. et al., The Dependence of the Oriented Growth of Carbon Filaments on the Intensity of a Magnetic Field, Carbon (2006) 44, 1913-1918.

Pol, V.G. et al., Thermal Decomposition of Tetraethylorthosilicate (TEOS) Produces Silicon Coated Carbon Spheres, J. Mater. Chem. (2004) 14, 966-969.

Pol, V.G. et al., Sonochemical Deposition of Air-Stable Iron Nanoparticles on Monodispersed Carbon Spherules, Chem. Mater. (2003) 15, 1378-1384.

Pol, S. V. et al., A Solvent Free Process for the Generation of Strong, Conducting Carbon Spheres by the Thermal Degradation of Waste Polyethylene Terephthalate, Green Chem. (2009) 11, 448-451.

Koltypin M. et al., The Study of Carbon-Coated V2O5 Nanoparticles as a Potential Cathodic Material for Li Rechargeable Batteries, Journal of the Electrochemical Society (2007) 154 (7) A605-A613.

Pol, S.V. et al., Encapsulating ZnS and ZnSe Nanocrystals in the Carbon Shell: A RAPET Approach, J. Phys. Chem. C. (2007) 111, 13309-13314.

Odani A. et al., Testing Carbon-Coated VOx Prepared via Reaction Under Autogenic Pressure at Elevated Temperature as Li-Insertion Materials, Adv. Mater. (2006) 18, 1431-1436.

Pol, S.V. et al., Reactions Under Autogenic Pressure at Elevated Temperature (RAPET) of Various Alkoxides: Formation of Metals/Metal Oxides-Carbon Core-Shell Structures, Chem. Eur. J. (2004) 10, 4467-4473.

Pol, V.G. et al., Semiconducting, Magnetic or Superconducting Nanoparticles Encapsulated in Carbon Shells by RAPET Method, Carbon—Sci. Tech. (2008) 1, 46-56.

Wang, Y. et al., Nano Active Materials for Lithium-Ion Batteries, Nanoscale 2010, http://www.rsc.org.

St. Dennis, J.E. et al., Carbon Microspheres as Ball Bearings in Aqueous-Based Lubrication, ACS Appl. Mater. Interfaces 3 (2011), 2215-2218.

Wang, Q. et al., Monodispersed Hard Carbon Spherules With Uniform Nanopores, Carbon 39 (2001), 2211-2214.

Inagaki, M. et al., Pressure Carbonization of Polyethylene-Polyvinylchloride Mixtures, Carbon 21 (3) (1983), 231-235.

Ayache, J. et al., Mechanism of Carbonization Under Pressure, Part I: Influence of Aromaticity (Polyethylene and Anthracene), Carbon 28, 2/3 (1990), 337-351.

Yang et al., Nanographene-Constructed Hollow Carbon Spheres and Their Favorable Electroactivity with Respect to Lithium Storage, Adv.. Mater 22 (2010), 838-842.

Inagaki et al., Conditions for Carbon Spherule Formation Under Pressure, Carbon 22 (6), (1984), 617-619.

Ryu, J. et al., Hydrothermal Preparation of Carbon Microspheres From Mono-Saccharides and Phenolic Compounds, Carbon 48 (2010), 1990-1998.

Li, H. et al., Research on Advanced Materials for Li-Ion Batteries, Adv. Mater. 21 (2009), 4593-4607.

* cited by examiner

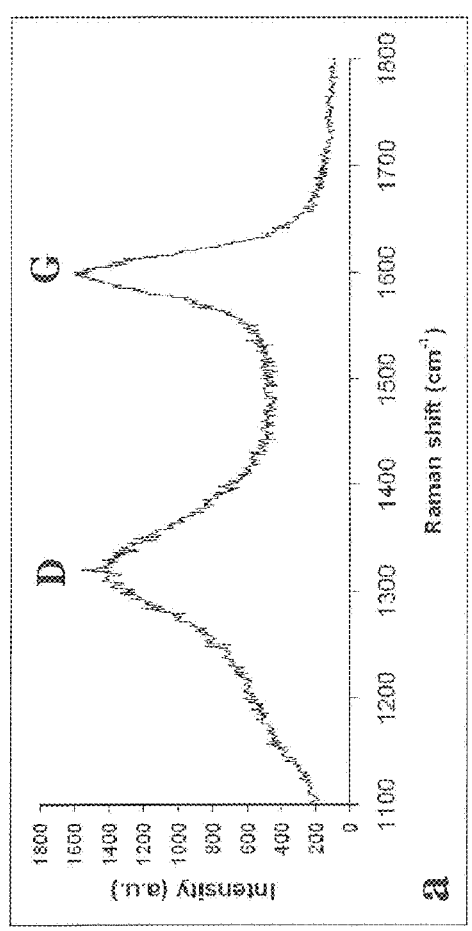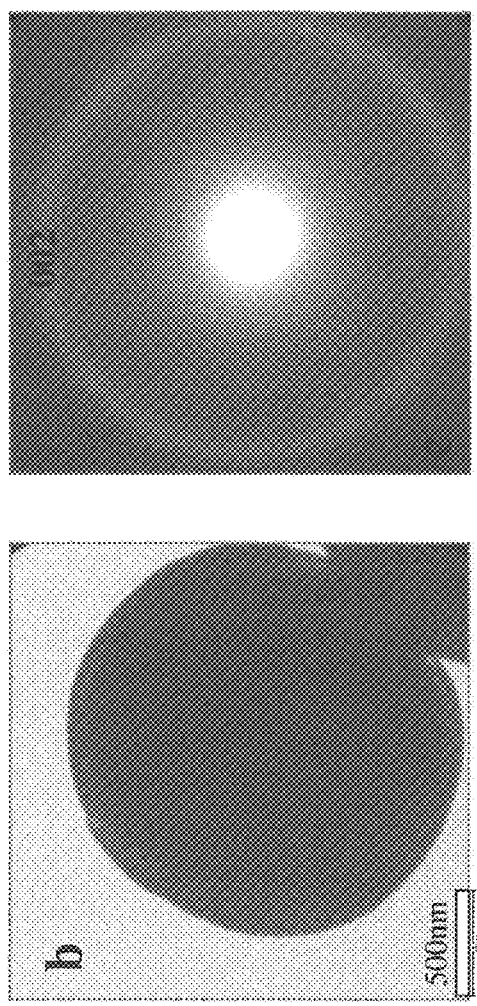
FIG. 2

MATERIALS AS ADDITIVES FOR ADVANCED LUBRICATION

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to novel lubricant compositions comprising a particulate carbon material suspended in a liquid carrier, which provide beneficial anti-friction and anti-wear properties. The particulate materials have various shapes, sizes, and structures and are synthesized by autogenic reactions under extreme conditions of high temperature and pressure. Specifically, the lubricant compositions have the ability to significantly lower friction and wear, which translates into the advantages of improving the durability and fuel economies of motorized and mechanical devices.

BACKGROUND OF THE INVENTION

The transportation share of U.S. energy consumption is around 28% (or 28.4 quadrillion Btu) with petroleum accounting for 96% of this amount (every day, the U.S. consumes about 13 million barrels of petroleum for transportation). Engine and drive-train friction accounts for 10-15% of the fuel's total energy used in current vehicles, which translates to about 1.3 to 2 million barrels of petroleum/day lost to friction alone. Furthermore, a significant amount of energy is spent to remanufacture and/or replace worn parts in these systems. In short, the energy efficiency, durability, and environmental compatibility of all motorized and mechanical devices are closely related to the effectiveness of the lubricants on rolling, rotating, and sliding contact surfaces. Poor or inefficient lubrication results in higher friction and severe wear losses, which in turn adversely impacts performance and durability [1]. In addition, lubricants can include additives such as viscosity index improvers, anti-oxidant agents, anti-corrosion agents, wear-protection agents, acid neutralizers, dispersants and the like to provide beneficial properties.

The energy efficiency, durability, and environmental compatibility of all kinds of moving mechanical systems (including engines) are closely related to the effectiveness of the lubricants being used on their rolling, rotating, and sliding surfaces. Therefore, lubricants play a vital role in machine life, efficiency, and overall performance. Poor or inefficient lubrication always result in higher friction and severe wear losses, which can in turn adversely impact the performance and durability of mechanical systems. In particular, progressive wear due to inadequate lubrication is one of the most serious causes of component failure. Inadequate lubrication can also cause significant energy losses in the above-mentioned industrial systems mainly because of high friction.

Currently, there are numerous solid lubricants available at sizes ranging from 1 nm to more than 500 nm in powder forms. The finer solids (i.e. 1 to 30 nm range) are mostly made of nanostructured carbons, like $C_{60}$, nano-tubes, nano-fibers, and nano-onions while intermediate range lubricants (30 to 100 nm) are made of inorganic solids, such as $MoS_2$, $WS_2$, h-BN and pure metals (like gold, silver, tin, bismuth, etc.). $WS_2$ is synthesized typically in the form of fullerene-like particles and hence it is often referred to as inorganic fullerene or, IF. Most of these materials are manufactured using a bottom-up approach involving multi-step chemical synthesis routes (e.g. gas phase chemical processing, combustion synthesis, sonochemistry, etc.) and the uses of environmentally unsafe chemicals. Many current processes also generate large amounts of toxic by-products to deal with after the manufacturing.

There is an ongoing need for new lubricant compositions that are environmentally friendly or benign, and which provide reduced friction and wear. The present invention addresses this need.

SUMMARY OF THE INVENTION

The present invention relates to the development of various carbon-based additive materials for improving the anti-friction and anti-wear properties of lubricants, for example, in engine oils, diesel fuels and greases. Conventional lubricants do not yet meet the expectations of providing the performance requirements of motorized and mechanical devices. Carbon is an extremely versatile material that exists in numerous forms with diverse physical, chemical, electrical and electrochemical properties. Certain carbonaceous particles, such as carbon nano-onions, carbon nano-fibers, carbon nano-tubes and sub-micron graphite particles have all been considered for lubrication purposes in the past but they tend to be expensive, ineffective, and difficult to scale-up.

The present invention relates to the design and development of novel carbon-based materials as anti-friction and anti-wear additives for advanced lubrication purposes. The carbon-based materials have various shapes, sizes, and structures and are synthesized by autogenic reactions under extreme conditions of high temperature and pressure. The materials of the invention are created typically by the dissociation of organic, organo-metallic or polymeric compounds, such as plastic waste in absence or presence of a catalyst in a closed, ventable reactor in which the pressure in the reactor is provided solely by vaporization of carbon-based precursors (i.e., autogenic pressure generation). The resulting carbon products are typically in the form of carbon nanotubes, fibers, spheres or clusters that can optionally contain elements such as B, Fe, Co, Ni, Mo, W, Ag, Au, Sn, Bi or their oxides, carbides, borides, nitrides and sulfides. Under severe tribological conditions, these carbon-based additives can improve lubrication properties without having a negative environmental impact. Specifically, the novel lubricants have the ability to significantly lower friction and wear, which can translate, for example, into improved fuel economies and longer durability of engines and mechanical devices.

In one embodiment, the present invention provides a lubricant composition comprising carbon particles suspended in a liquid hydrocarbon carrier. The carbon particles are prepared by heating a neat, high or low density polyethylene-containing precursor composition in a sealed reactor at a temperature in the range of at least about 700° C. and under an autogenic, self generated pressure in the range of about 800 to about 2000 pounds-per-square inch (psi), subsequently cooling the reactor to less that 100° C., and isolating the resulting particulate carbon material from the reactor. Preferably, the carbon particles are present in the composition at a concentration in the range of about 0.1 to about 2 percent by weight (wt %), more preferably about 0.5 to about 1 wt %.

In some preferred embodiments, the composition further comprises a surfactant (e.g., to aid in suspension of the carbon particles. Non-limiting examples of suitable surfactants include non-ionic surfactants such as sorbitan trioleate. Other suitable surfactants include sorbitan sesquioleate (SSO) and Surfonic LF-17 (an ethoxylated and propoxylated linear $C_{12}$-

$C_{12}$ alcohol). Preferably, the surfactant is present in the composition at a concentration in the range of about 1000 to about 20000 parts-per-million (ppm), more preferably about 5000 to about 10000 ppm.

The liquid hydrocarbon carrier preferably comprises a poly (alpha olefin). Examples of suitable hydrocarbon carriers include poly(alpha olefin) materials. Preferred poly(alpha olefin) materials have a kinematic viscosity in the range of about 4 to about 10 centistokes (cSt) at about 100° C., e.g., about 4 cSt.

In some preferred embodiments, the precursor composition of the carbon particles is high or low density polyethylene, and the particles are generally spherical in shape, not hollow, and have an average diameter in the range of about 1 to about 5 micrometers. Optionally, the spherical particles can be heat-treated under an inert atmosphere at a temperature in the range of about 1000 to about 3000° C. prior to suspending in the liquid hydrocarbon carrier, and the carbon particles have a density of about 2 grams-per-cubic centimeter (g/cc) to about 2.3 g/cc (e.g., about 2.1 g/cc).

In other preferred embodiments, the precursor composition of the carbon particles the precursor composition comprises a combination of low or high density polyethylene and about 5 to about 20 wt % of a metal-containing compound. For example, the metal-containing compound can be a metal carboxylate salt, metal phosphate salt, a metal oxide, a metal sulfide, a metal carbine, a metal boride, a metal nitride, or an organometallic compound. Examples of suitable metals for the metal-containing compound include B, Fe, Co, Ni, Mo, W, Ag, Au, Sn, and Bi.

In one preferred embodiment, the metal-containing compound comprises cobalt acetate, and the carbon particles comprise metallic cobalt nanoparticles with face-centered cubic crystal symmetry encapsulated within carbon nanotubes having an average tubular diameter of less than about 100 nm. When the metal-containing compound comprises ferrocene, the carbon particles comprise metallic iron nanoparticles with face-centered cubic crystal symmetry encapsulated at the tip of carbon nanotubes having an average tubular diameter of less than about 100 nm.

Tribological studies of lubricant compositions of the present invention demonstrate a 30 to 40% reduction in wear relative to pure hydrocarbon-based lubricant is feasible even under severe sliding conditions. Reduction in friction was also substantial. Further improvements in lubrication properties can be expected by tailoring the reaction conditions and morphological properties of the carbon materials, for example, by graphitization of the carbon spheres or nanotubes, controlling particle size and surface properties to ensure that individual particles remain in suspension, preferably as a colloid through steric stabilization or electrostatic stabilization, to prevent aggregation of the particles. Overall, the lubricant compositions of the present invention have high potential to further enhance the lubricity of current lubricants formulations and hence improve the engine efficiency and performance of motorized and mechanical devices. Moreover, the autogenic processes described in this invention to prepare the carbon-based particle component of the lubricants is very versatile and can be used to synthesize a wide variety of nano-lubricant additive materials, such as boron oxides, metal sulfides, and the like.

BRIEF DESCRIPTION OF THE DRAWINGS

FIG. 2 provides (a) Raman spectrum of as-prepared carbon spheres; (b) Transmission electron micrograph of carbon single sphere; and (c) Electron diffraction image of carbon spheres.

DETAILED DESCRIPTION OF THE PREFERRED EMBODIMENTS

Figure 1:
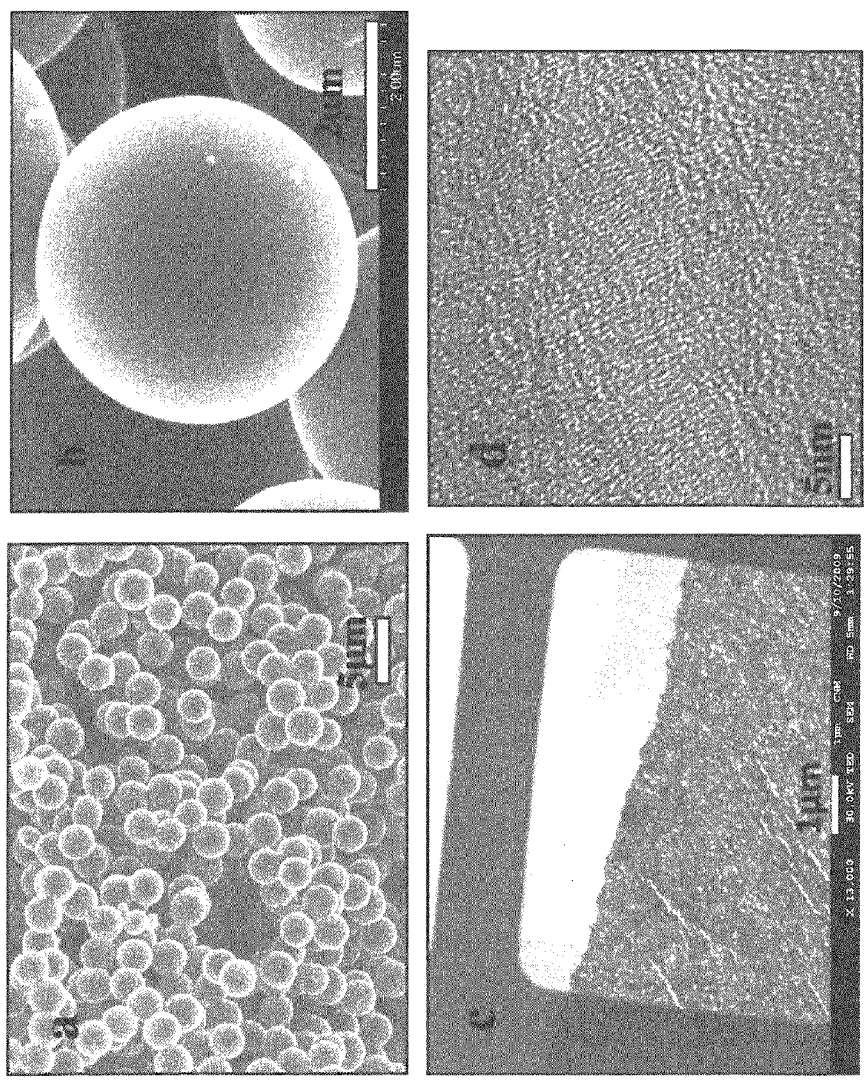
FIG. 1 provides (a) Scanning electron micrograph (SEM) of carbon spheres synthesized by an autogenic reaction; (b) High resolution SEM image of single carbon sphere; (c) Transmission electron micrograph (TEM) cross section of carbon sphere; and (d) High resolution TEM image cross section of carbon sphere.

The following examples are provided to illustrate certain preferred embodiments of the present invention, and are not to be considered a limiting the scope of the appended claims. The examples demonstrate, in particular, the versatility of autogenic reactions in synthesizing carbon-based materials with a diverse range of particle morphologies, conducive to their use as additives for lubrication technology.

Description of Test Equipment and Facilities
  Autogenic Reactor.
  The typical custom made reactor used in the making of the carbon-based additives can operate up to a maximum working pressure of about 2000 pounds per square inch and a maximum temperature of about 800° C. To fabricate the wide range of carbon-based materials in our invention, various autogenic reaction parameters such as heating rate, temperature, duration, reactant concentration, stoichiometry, pressure, and atmosphere (either oxidizing, reducing or inert) have to be carefully controlled. The additives can be synthesized either in amorphous or crystalline form. Moreover, the autogenic method can produce, in situ, distinct 'core-shell' materials, for example, those with a metal, metal alloy, or metal oxide core and an outer shell containing carbon moieties. Preferably, the reactor operates under conditions ranging from a minimum working pressure of about 100 pounds per square inch and a minimum temperature of about 100° C., to a maximum working pressure in the range of about 800 to about 2000 pounds per square inch and a maximum temperature in the range of about 300 to about 800° C. The novel carbon additives produced by the specific reactor of this invention can be used in a wide range of lubrication applications, including, for example, internal combustion engines, wind turbines, compressors, space mechanisms, and hydraulics.

Lubricant Test-Sample Preparation.
  Carbon spheres and tube-like carbon materials produced under autogenic conditions were mixed with and dispersed in a selected base-lubricant (Poly alpha olefin, 4 cSt). Specifically, 1 wt. % of particulate sample was added to the base-lubricant to prepare the colloidal mixture of carbon spheres and tubes in the base oils. The blend was stirred continuously at 60° C. for approximately 1 hour prior to being evaluated with several tribological test machines.

Tribological Test Set-Up.
  The tribological performance of the test lubricants was evaluated using the facilities at the Tribology Section at Argonne National Laboratory. Tests were conducted at extremely high contact pressures and at elevated temperatures that are representative of the typical operating conditions of real automotive/industrial components. Two different tests were conducted: 1) Ball-on-Disc (severe Point contact) Test; 2) HFRR (extremely severe Line contact).

Ball-on-Disc Tribo-Tester.
  The ball was loaded on top of the plate in order to create a contact pressure of 1 GPa. The tests were conducted at 100° C. The plate was rotated at variable speeds and it was pressed and sliding against the ball sample. The variation in the speed of the plate rotation affected the lubrication regime. The speed was changed every 15 minutes from high speed to low speed and then back to high speed. Thus, the setup was made to simulate extreme test conditions.

HFRR Tribo-Tester.
  The cylinder was loaded on top of the plate sample in order to create a contact pressure of 1 GPa. The tests were conducted at 100° C. The plate was reciprocated at a constant speed of 50 rpm (1 Hz) and it was sliding against the cylindrical sample. Thus, the setup was made to simulate extreme line contact test conditions.

Post-Test Analysis.
  Once, the tribological tests were completed, the test samples (ball, cylinder and plates) were retrieved and cleaned using solvents. After cleaning, the worn areas, roughness measurements were made using an optical microscope. Selected samples were observed using Electron Microscopy to check for wear patterns. The FIB-TEM (Focused Ion Beam—Transmission Electron Microscopy) facility at the University of Illinois-Urbana Champaign was used to visualize the boundary or tribochemical reaction film on the rubbing surface. In order to measure the thickness of the tribofilm, selected tribological test samples were mounted in a focused ion beam (FIB) microscope. An area of uniform tribofilm on the wear track was isolated and an area of 5 μm×20 μm was milled using a gallium ion beam in a direction perpendicular to the motion of the cylinder. The depth of the sputtered area in each case was approximately 4 μm. A transmission electron micrograph revealing the cross section of the tribofilm was generated using the secondary electron detector located at an angle of 54° from the direction vertical to the surface of the sample.

Example 1

Preparation of Carbon Spheres

The controlled thermal decomposition of high density or low density polyethylene at about 700° C. for about 1 min to 3 hours in a closed reactor under autogenic (self-generating) pressure yielded solid carbon microspheres, approximately 1-5 μm in diameter, as illustrated in the scanning electron microscope images in FIG. 1, panels (a) and (b). The particles are almost perfectly spherical in shape and have smooth surfaces. The cross-section transmission electron micrograph confirmed that the carbon spheres are solid and not hollow (FIG. 1, panel c). Elemental C, H, N, S analyses showed that the carbon spheres are comprised of more than 98 wt. % carbon and less than 0.4 wt. % hydrogen; no significant amounts of N or S were detected. EDX elemental analyses confirmed that the spheres were essentially carbon; no impurities are detected by this method. The turbostratically disordered structure of the as-prepared spheres is reflected by the broad X-ray diffraction peaks centered at approximately 25, 42.3 and 44.3° 2θ that correspond to the layering (002), (100), and (101) reflections, respectively. The broad (002) peak, in particular, encompasses diffuse sets of interlayer distances that, on average, are larger than those in crystalline graphite (typically 0.344-0.355 nm). The high resolution transmission electron micrograph of a cross section of carbon spheres is depicted in FIG. 1*d*. The short order graphitic planes and some disorder are observed. The interlayer spacing results are analogous to XRD measurements.

Raman spectra were obtained at room temperature using an In Via Raman spectrometer using 633 nm red laser with 10% intensity to determine the extent of graphitic disorder within the carbon spheres. The Raman spectrum of the as-prepared carbon spheres (FIG. 2*a*) is typical for a hard carbon, with a broad band at 1315 cm$^{-1}$ representing a highly disordered (D) graphite arrangement within the carbon spheres and a band at 1585 cm$^{-1}$, characteristic of a more ordered graphitic (G) structure. The D band has been attributed to the vibration of carbon atoms with dangling bonds for the in-plane terminated disordered graphite component. The G-band, corresponding to the $E_{2g}$ mode, is closely related to the vibration of sp$^2$ bonded carbon atoms in a 2-dimensional hexagonal lattice, as in graphene. Methodically measuring the peak heights of D and G bands, the ID/IG ratio was calculated for the carbonaceous materials. The intensity ratio of the D- and G-bands (ID/IG) of 1.1 further quantifies the relative levels of disordered glassy carbons, indicating that the processing temperature at which the spheres were synthesized (700° C.) was not sufficiently high to allow for the alignment and growth of graphitic sheets within the carbon macrostructure. The graphitic content within the carbon spheres can be increased and controlled by subsequent heating in an inert atmosphere or under vacuum, for example, about 1000 to about 3000° C., preferably about 2000 to about 3000° C. to increase the inherent strength and toughness of the spheres. The transmission electron micrograph of the as-prepared carbon spheres showed a very smooth surface with several micrometer diameters (FIG. 2b). The BET (Brunauer, Emmett, Teller) surface area measurements were carried out using a Quantachrome Instrument after outgassing the carbon spheres at 150° C. for 12.0 hrs. The BET surface area of carbon sphere was measured to be 4.6 m$^2$/g, with a total pore volume of 0.0078 cc/g. The density measurements of carbon spheres were determined using an automatic density analyzer (Quantum Instruments, Ultrapyc 1200e at 22° C.) with purging He gas. The measured average density of carbon spheres was 2.3 g/cc, which is close to the theoretical value for graphitic carbon. The diffuse X-ray diffraction image due to an amorphous carbon product (FIG. 2c) is consistent with the Raman data.

Figure 3:
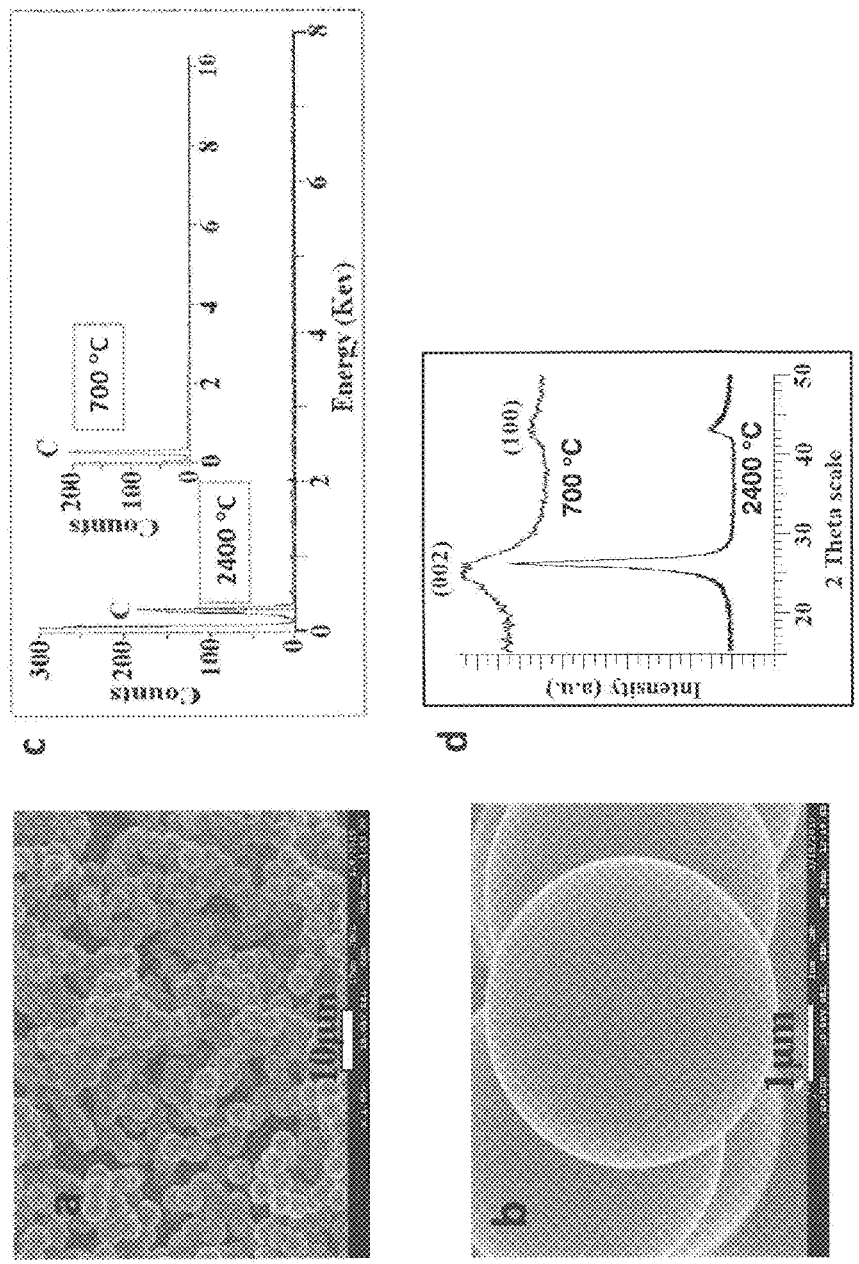
FIG. 3 provides (a-b) Scanning electron micrograph of carbon spheres heat treated at 2400° C. in an inert atmosphere at different magnifications; (c) Comparative energy dispersive X-ray spectroscopy analysis of carbon spheres prepared at 700° C. and subsequent heat-treatment at 2400° C.; and (d) Comparative X-ray diffraction (XRD) patterns of carbon spheres prepared at 700° C. and subsequent heat-treatment at 2400° C.

Furthermore, the above-mentioned carbon spheres prepared at 700° C. were heated at 2400° C. for 1 hour under inert conditions to enhance the graphitic character of the spheres. It is apparent from FIGS. 3a-b that the heat treatment process had a negligible effect on the spherical shape and overall morphology of the particles, confirming the remarkable stability of the spheres when heated to an extremely high temperature. EDX elemental analyses confirmed that the spheres were essentially carbon; no impurities could be detected by this method in both as-prepared and heated carbon spheres samples (FIG. 3c). The measured average density of heat treated carbon spheres is approximately 2.1 g/cc. The BET surface area of heated carbon spheres is reduced to 1.05 m$^2$/g after high temperature heat treatments (2400° C.) for 1 hour in an inert atmosphere. The decrease in the surface area in the heated carbon spheres is attributed to the removal of pores during the high temperature treatment and sintering of the spheres that is believed to increase their strength and toughness. The XRD patterns of the heat-treated carbon sphere products are shown in FIG. 3d (top, (700° C.) and bottom (2400° C.), respectively). The increase in graphitic order on heating the carbon spheres to 2400° C. is observed. The increased strength and toughness of the heated carbon spheres is believed to account for the improved friction and wear behavior, as described more fully in the following sections. In particular, it is believed that the carbon spheres may act as ball bearings that employ a "rolling" mechanism to reduce the friction between sliding surfaces, and the wear thereof.

Example 2

Synthesis of Cobalt Encapsulated Carbon Nanotubes

Figure 4:
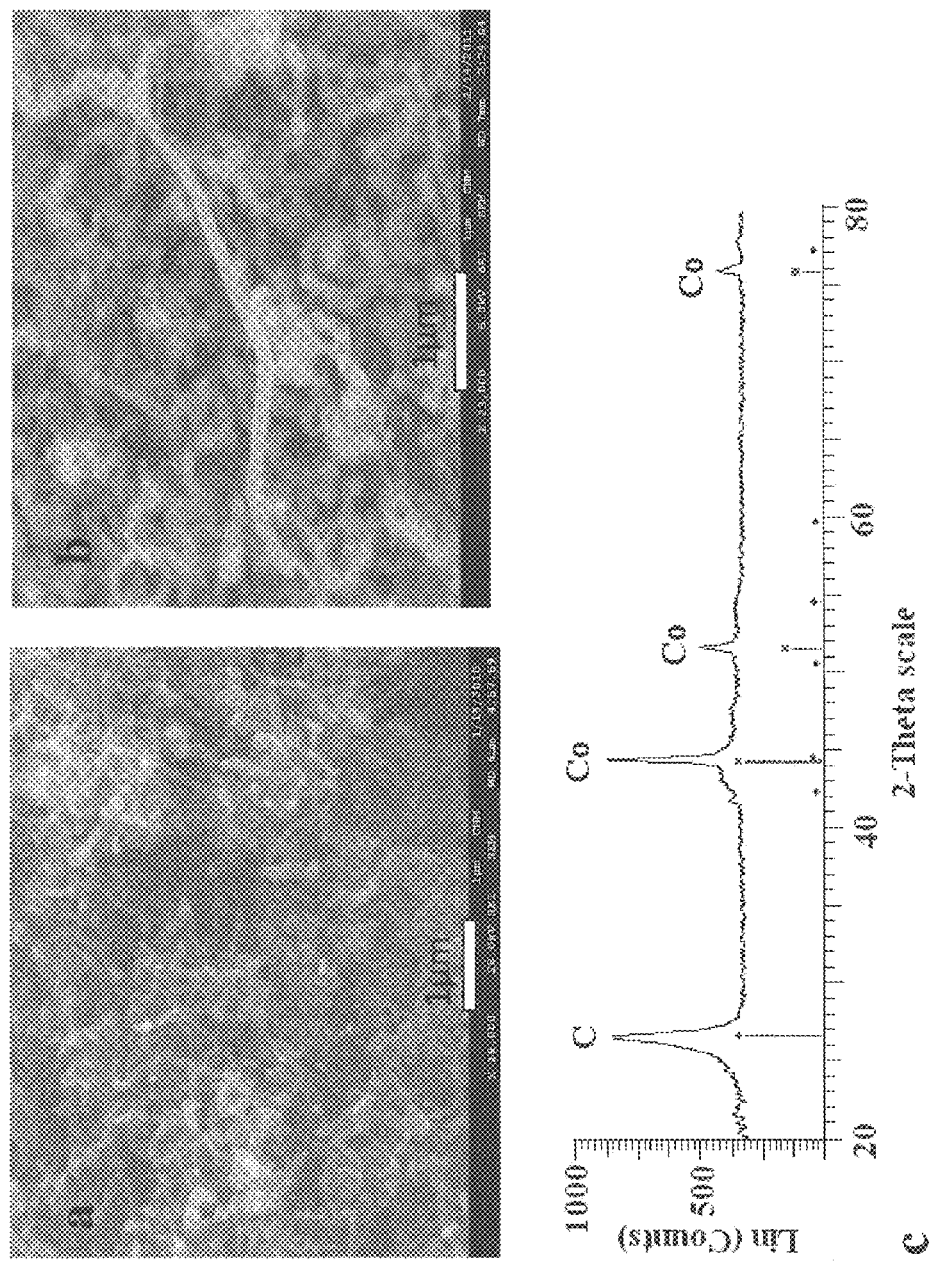
FIG. 4 provides (a-b) Scanning electron micrographs of cobalt encapsulated carbon nanotubes at various resolution; and (c) powder X-ray diffraction pattern of cobalt encapsulated carbon nanotubes.

Using two different catalysts, carbon nanotubes were prepared under autogenic conditions. In the first case, the thermal decomposition of 2 g of low density polyethylene (LDPE) and 20 wt % cobalt acetate, $Co(C_2H_3O_2)_2$ catalyst was carried out by a similar procedure to that described above. Up to 680° C., the pressure within the reactor reached about 50 psi (3.4 atm) before increasing rapidly to 1000 psi (68 atm) at 700° C. At 700° C., the reactor was heated for 2 hours before being cooled to room temperature. The yield of carbon nanotubes (CNTs) was 40 wt. %. SEM images of the carbon nanotubes prepared by the thermolysis of low density polyethylene in the presence of a cobalt acetate catalyst, are shown in FIGS. 4a and 4b; the CNTs are several micrometers in length and have an average diameter of less than 100 nm.

The CNTs encapsulate nanosized metallic Co particles, less than 100 nm in size, as confirmed by transmission electron microscopy. X-ray diffraction data indicated that the carbon was largely graphitic in character and that the entrapped cobalt had face-centered-cubic symmetry (FIG. 4c). Similarly, the high density polyetheylene was used as a source of hydrocarbons for the production of carbon nanotubes under autogenic conditions.

Example 3

Synthesis of Iron Encapsulated Carbon Nanotubes

Figure 5:
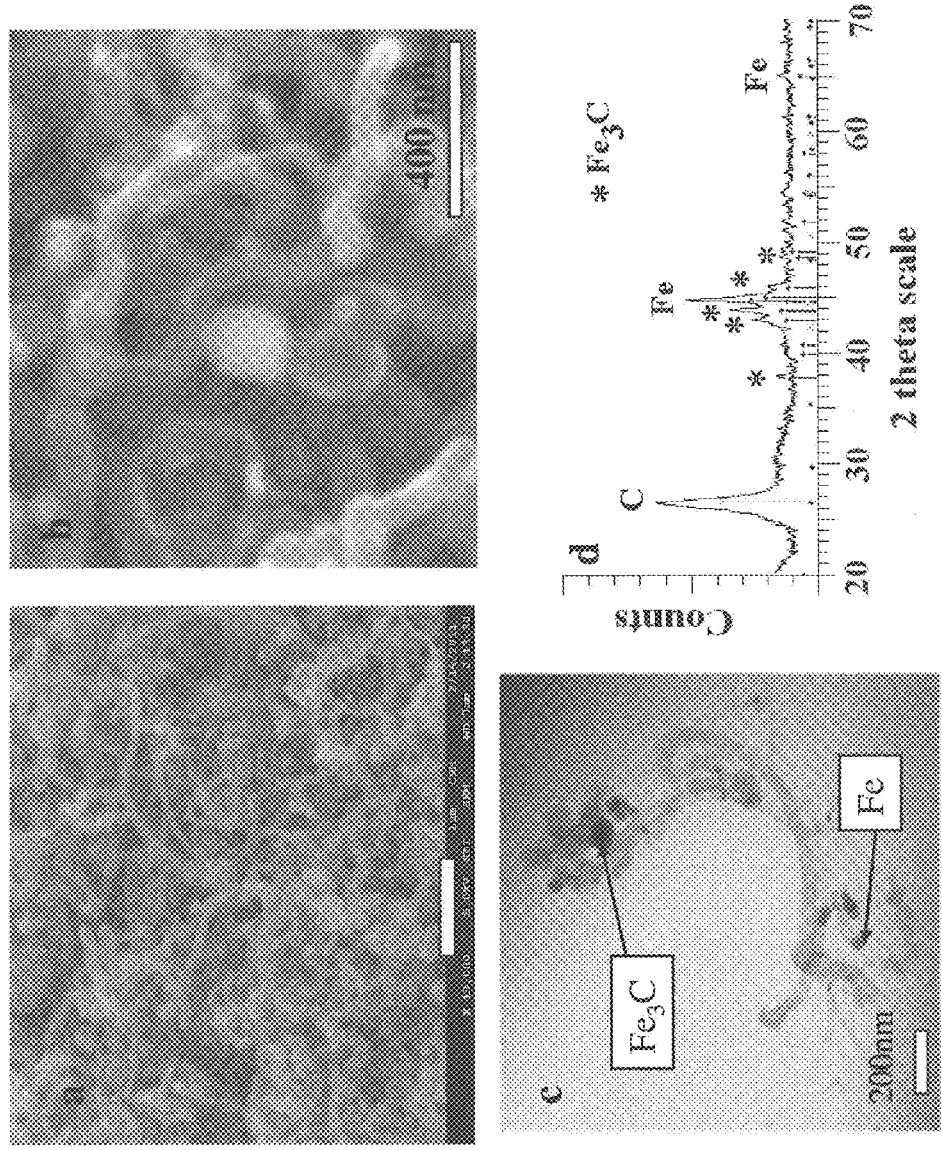
FIG. 5 provides (a-b) Scanning electron micrographs of iron encapsulated carbon nanotubes at various resolution; (c) transmission electron micrograph of iron encapsulated carbon nanotubes; and (d) powder X-ray diffraction pattern of iron encapsulated carbon nanotubes.

Because cobalt is relatively expensive element, iron based catalysts were evaluated. For example, the thermal decomposition of 2 g of low density polyethylene (LDPE) and 20 wt % ferrocene, $C_{10}H_{10}Fe$ catalyst at about 700° C. for about 3 hours in a closed reactor under autogenic (self generating) pressure yielded Fe-containing carbon nanotubes (CNTs). SEM images of these carbon nanotubes are shown in FIGS. 5a and 5b. The CNTs are several micrometers in length and have an average diameter of less than 100 nm. The transmission electron micrograph of an individual CNT shows a cylindrical form (FIG. 5c) that encapsulates the iron nanoparticle catalyst at the tip of the tube. CNTs with an approximate 30 nm inner diameter and a shell thickness of 20 nm are depicted in the TEM image. X-ray diffraction data (inset in FIG. 5d) indicated that the carbon nanotubes were largely graphitic in character and that the entrapped iron had face-centered-cubic symmetry. Additionally, small reflection peaks belongs to $Fe_3C$ (marked with asterisks) were observed indicating that the carbide phase can be formed at relatively low temperature under autogenic conditions.

These novel particles are derived from disposable plastics by the autogenic reaction process in the forms of spheres, tubes, tubes with metal encapsulation, and fibers. When mixed with appropriate lubricants, these particles have the capacity to significantly lower the friction and enhance wear resistance of sliding steel surfaces.

Example 4

Tribological Testing of Conventional Base-Lubricants

Tribological testing was conducted using the Ball-on-Disc Tribo-tester as described herein. A base-lubricant of poly (alpha olefin) having a viscosity of about 4 centiStokes (cSt) was tested under these extreme conditions. As shown in the FIG. 6(a), there was high friction under all sliding speeds. Moreover, the friction was very high (0.16) under lowest speed test conditions.

Figure 6:
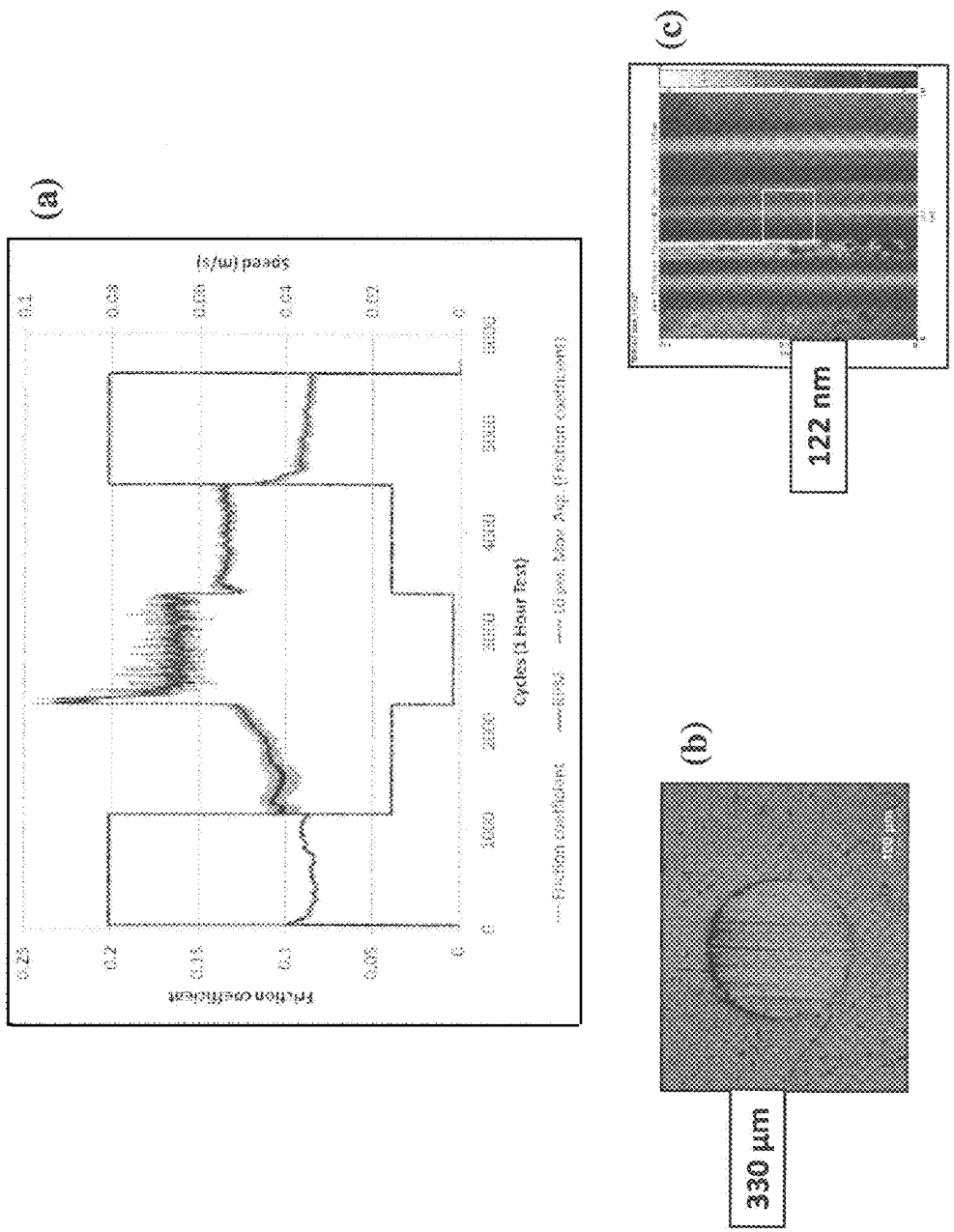
FIG. 6 illustrates friction (top) and wear (bottom) performance of a base oil when used in a sliding experiment where a steel ball slides against a steel plate.

The wear of the sliding surfaces after testing in base lubricant is shown in FIG. 6(b). There was a large wear scar formed on the ball surface after the tribological test. The diameter of this wear scar was about 330 μm. The high wear was most likely the result of poor performance of the base-lubricant. Moreover, the wear scar was not covered with a protective boundary film; hence, it was shiny and metallic looking The roughness results are presented in FIG. 6(c). The wear scar had a roughness value of about 122 nm.

The data indicate that the base-lubricant was unable to react with the sliding contact surfaces of ball and plate to form any type of protective boundary layer, and hence, resulted in high friction and high wear. The high friction affects efficiency and high wear affects durability of mechanical system.

Thus, the base-lubricant was unable to provide any significant tribological advantages.

Example 5

Tribological Testing of Carbon Sphere Based Lubricants

Tribological testing was conducted using the Ball-on-Disc Tribo-tester as described herein. The carbon spheres produced under the autogenic conditions of this invention as in Example 1 were dispersed in the base-lubricant described in Example 4 at a concentration of about 1 wt % and then were tested under the extreme test conditions mentioned above. As shown in the FIG. 7(a), there was substantial reduction in friction at all sliding speeds compared to the base-lubricant discussed in Example 4. Moreover, the friction was relatively moderate (0.12) under the lowest speed test conditions where more frequent metal-to-metal contacts occur.

Figure 7:
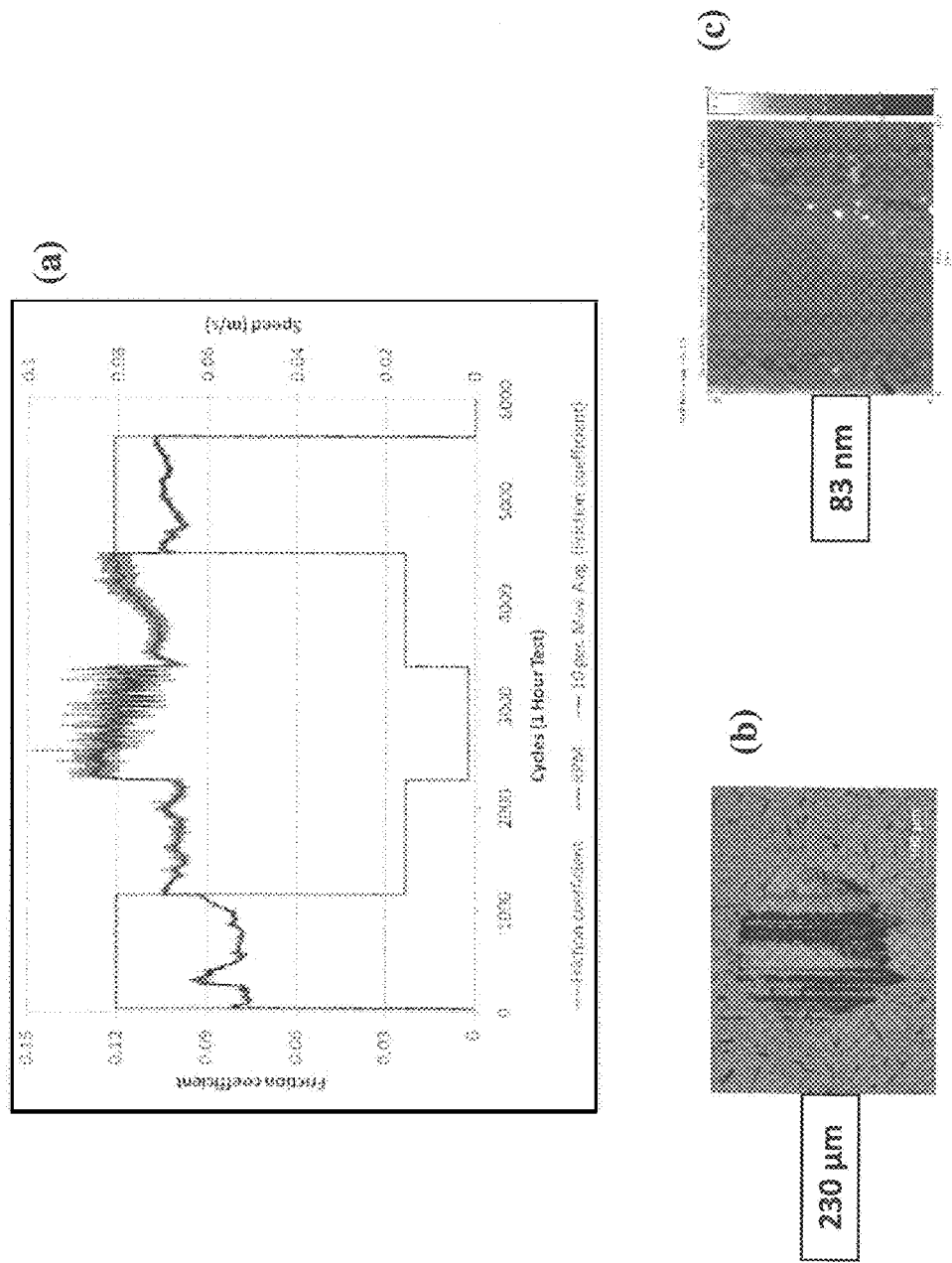
FIG. 7 illustrates friction (top) and wear (bottom) performance of a carbon sphere additive lubricant of this invention. The size of wear scar is reduced more than 30% and the severe abrasive wear marks are eliminated from the sliding surfaces.

The wear result from the carbon sphere-based lubricant is shown in FIG. 7(b). There was a partially dark wear scar on the ball surface after tribological testing and the wear scar was much smaller (i.e., 230 μm) than the scar observed in the test in base-lubricant (FIG. 6(b)). The wear scar was covered (about 50%) with a protective film. The roughness results are presented in FIG. 7(c). The wear scar had lower roughness (about 83 nm) than what was measured on a wear scar created in pure base-lubricant.

The data indicate that the carbon sphere-based lubricant was able to react with the contact surfaces of ball and plate to form a protective boundary layer. The wear scar was partially covered by a dark (black) layer of the carbon material, which resulted in reduction of friction and wear compared to the base-lubricant performance. The reduced friction can improve the efficiency while low wear enhances the durability of mechanical systems. Thus, the carbon sphere-based lubricant additive was able to provide superior friction and wear properties.

Example 6

Tribological Testing of Carbon Fiber-Based Lubricants

Tribological testing was conducted using the Ball-on-Disc Tribo-tester as described herein. Carbon fiber materials (about 1 wt %) produced under autogenic conditions were dispersed in the base-lubricant described in Example 4 and then tested under the extreme conditions of the Ball-on-Disc test. As shown in the FIG. 8(a), there was a marked reduction in the friction coefficient under all steps of sliding speed compared to what was observed from the base-lubricant alone. Moreover, the friction was still reasonable (i.e., 0.12) under the lowest speed test conditions.

Figure 8:
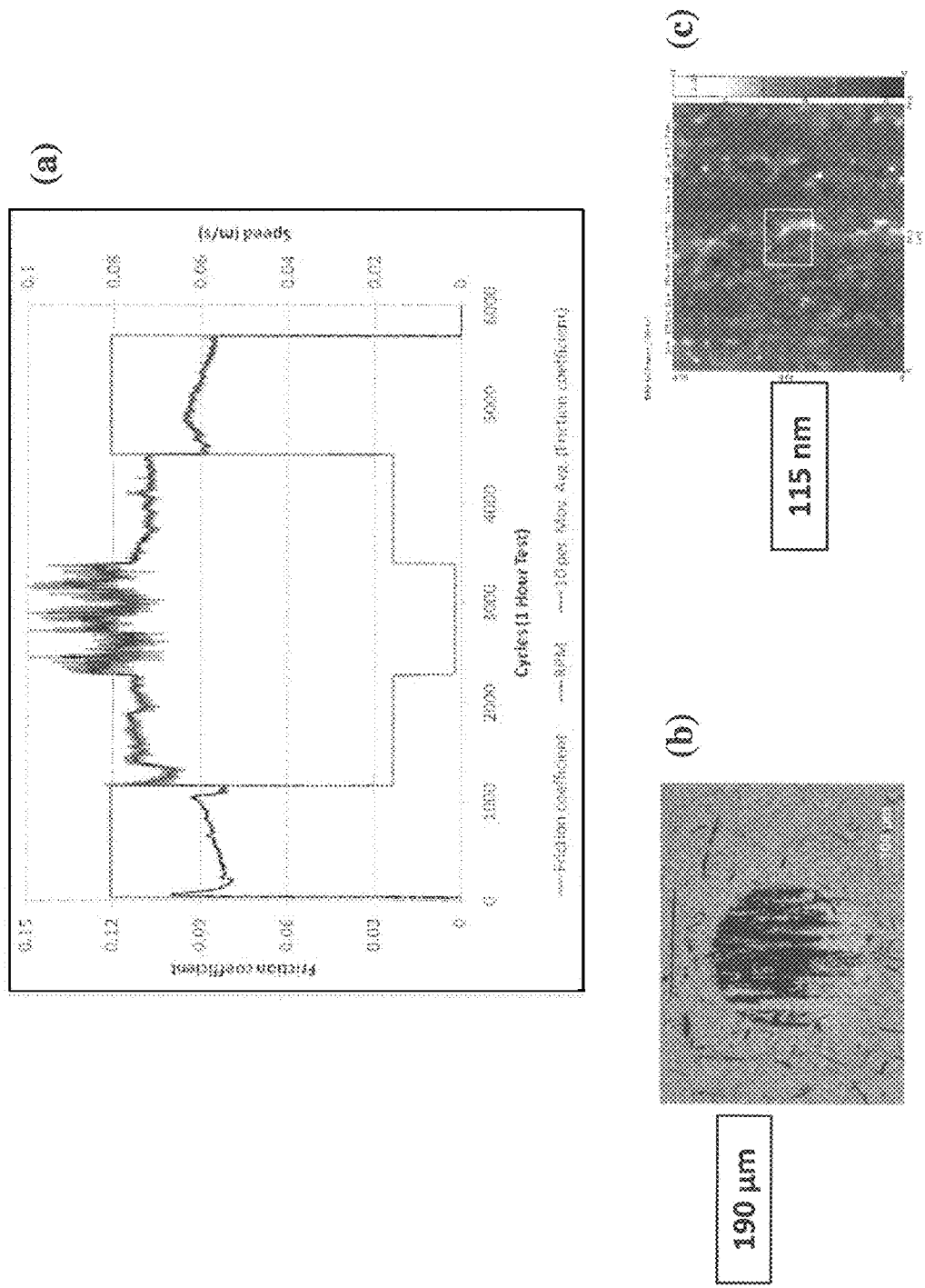
FIG. 8 illustrates friction (top) and wear (bottom) performance of a carbon fiber-containing lubricant of this invention. The wear scar is reduced more than 40%, while the abrasive wear marks are eliminated from the sliding surface.

Wear results for the carbon fiber-based lubricant is presented in FIG. 8(b). There was a significantly smaller and darker wear scar formed on the sliding ball surface after tribological tests. The actual size of the wear scar was about 190 μm in size compared to 330 um diameter wear scar formed during tests with the base-lubricant alone (FIG. 6(b)). The wear scar was mostly covered (about 70%) with a protective darker-looking carbon film. The roughness results are presented in FIG. 8(c). The wear scar had a roughness value of about 115 nm.

It is believed that the carbon fiber-based lubricant was able to react with the sliding contact surfaces of ball and plate to form a highly protective carbon-rich boundary layer. Formation of such a boundary film resulted in the reduction of friction and wear compared to the base-lubricant performance. The reduction in friction improves the efficiency and low wear enhances the durability of the mechanical system. Thus, the new carbon fiber-based lubricant provided excellent tribological results.

Example 7

Improved Performance of Carbon Sphere Based Lubricants

It was demonstrated in Example 5 that carbon spheres (heat-treated at 700° C.) provided good tribological performance when used as an additive to a base-lubricant. However, there were two factors that may have limited optimum performance, i.e., (1) dispersibility of the carbon particles in the carrier oil over an extended period of time, and (2) relatively higher friction values under extreme boundary conditions.

In order to keep the carbon particles suspended in the carrier oil, a surfactant was added (sorbitan trioleate (STO) about 10000 ppm), which provided very good performance and very consistent and long-duration shelf life without particle agglomeration, separation or settlement. It is believed that the particles were covered by the hydrophilic chains of STO, and therefore, increased the homogeneous dispersion/suspension of the carbon sphere particles in the base-lubricant.

Figure 9:
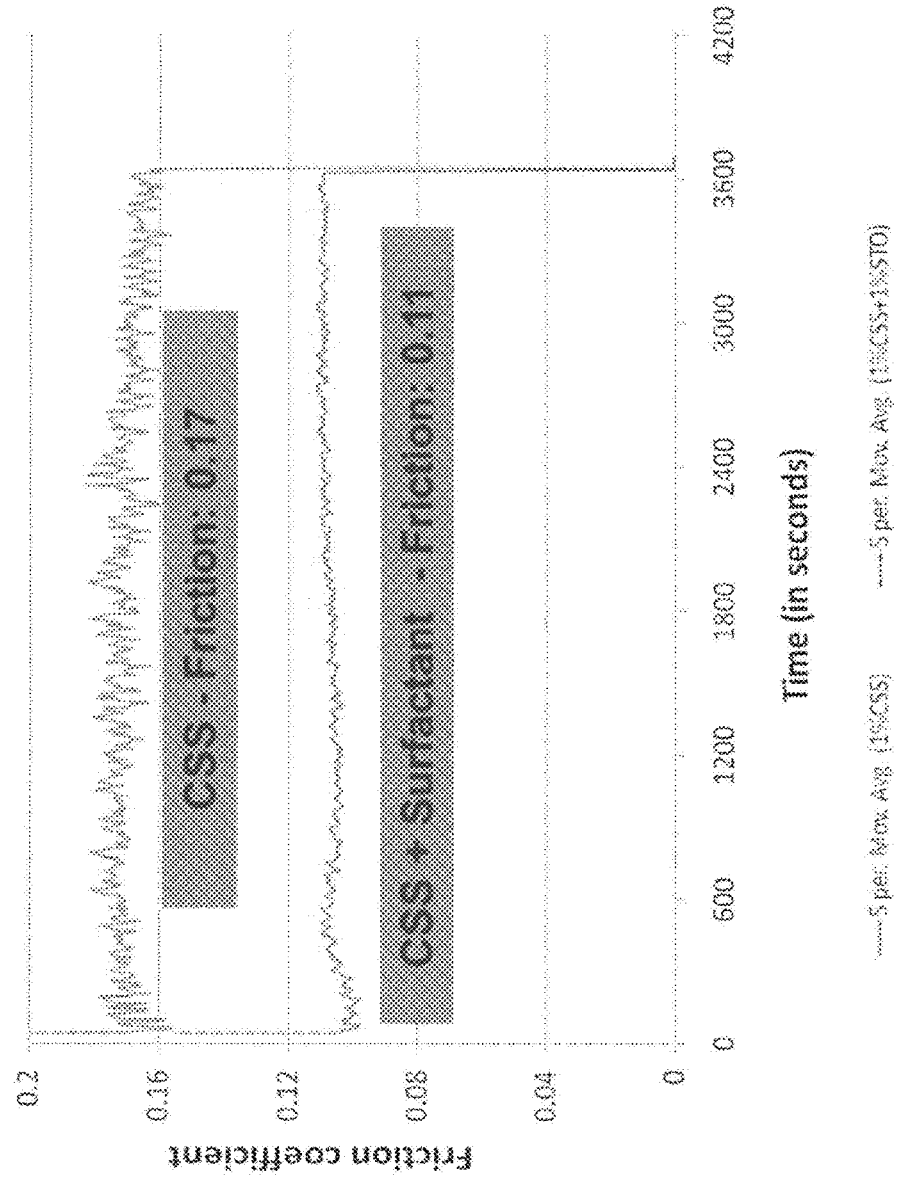
FIG. 9 illustrates improved friction performance of a carbon sphere-containing lubricant using the as-prepared spheres (700° C.) with the addition of a surfactant. The friction coefficient is reduced by more than 30% with improved wear resistance.

Tribological tests were conducted under severe line contact conditions and at high temperatures using the High Frequency reciprocating rig (HFRR Tribo-tester) as described herein. As shown in FIG. 9, there was a 30% reduction in the friction when the carbon sphere additive and STO based lubricant composition was used, when compared to the carbon sphere-based lubricant alone. Addition of surfactant (STO) to the carbon sphere-based lubricant additive of this invention significantly improved the dispersibility of the carbon spheres and it was also able to further improve the friction performance of the carbon sphere-based lubricant composition.

Example 8

Improved Performance of Carbon Fiber-Based Lubricants

Tribological tests under extreme severe line contact conditions were conducted using the High Frequency reciprocating rig (HFRR Tribo-tester) as in Example 7. Carbon-fiber particles produced by the autogenic reactions of this invention were dispersed in the base-lubricant with and without the STO surfactant (10000 ppm) and then tested under these extreme conditions. As shown in the FIG. 10, there was a 30% reduction in friction when the carbon sphere and STO based lubricant compared to the carbon fiber-based lubricant without surfactant. Addition of the STO surfactant to the carbon fiber-based lubricant additive of this invention significantly improved the dispersion/suspension of the carbon spheres and the friction performance of the carbon fiber based lubricant.

Example 9

Improved Performance of High-Temperature Treated Carbon Sphere-Based Lubricants

Figure 11:
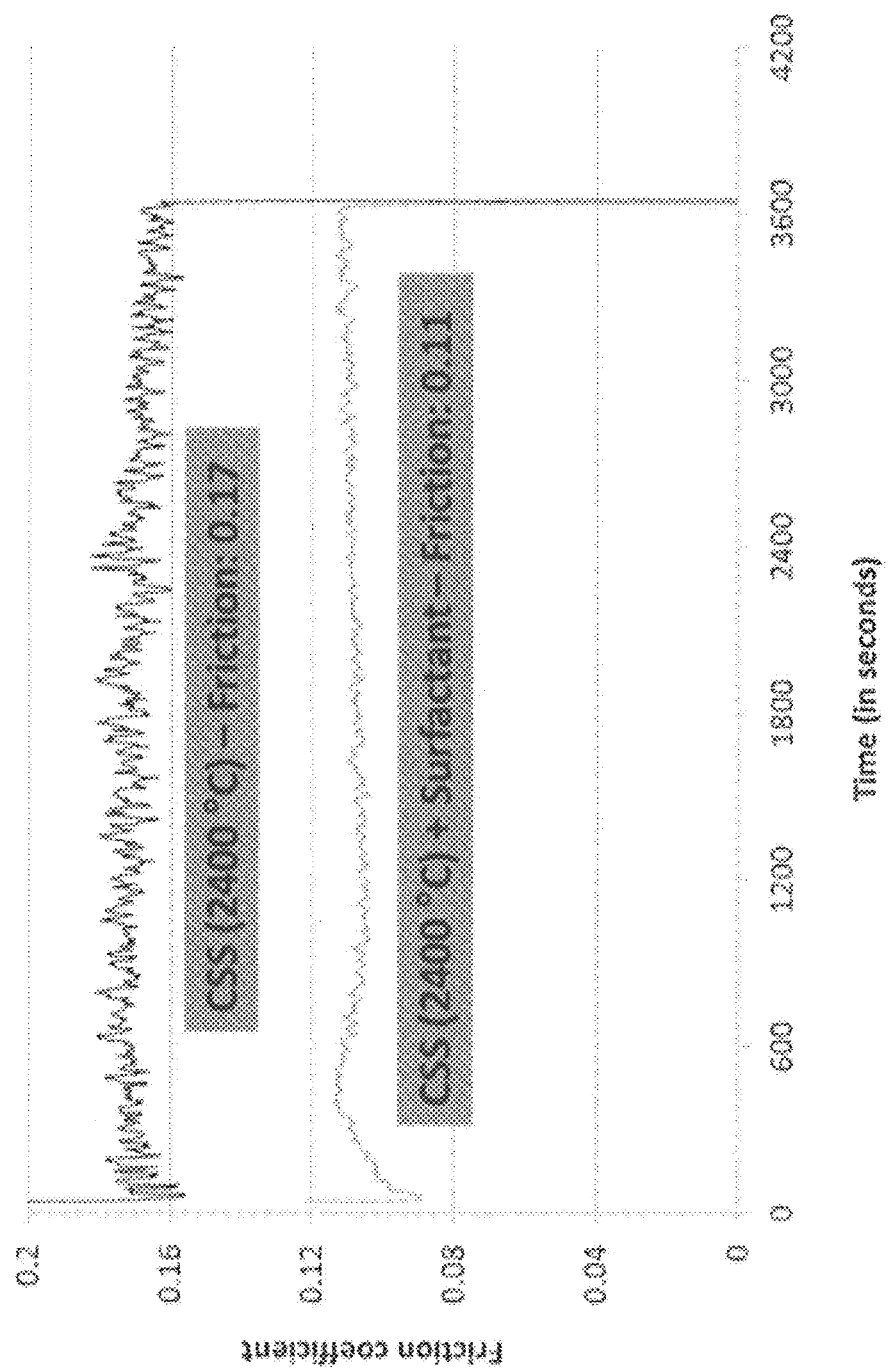
FIG. 11 illustrates improved friction performance of a carbon sphere-based lubricant using the spheres that had been heat-treated at 2400° C. with the addition of a surfactant. The friction coefficient is reduced by more than 30% with improved wear resistance.

Tribological tests were conducted under severe line contact conditions and at high temperatures using the High Frequency reciprocating rig (HFRR Tribo-tester) as in Example 7 and 8. Heat treated carbon spheres produced under autogenic conditions as in Example 1 were dispersed in the base-lubricant (at a concentration of about 1 wt %) with and without the STO surfactant (10000 ppm) and then tested under the severe test conditions mentioned above. As shown in FIG. 11, there was a 30% reduction in the friction of this carbon sphere- and STO-based lubricant composition compared to the carbon sphere-based lubricant alone. Moreover, there was excellent wear resistance offered by these carbon spheres (heat-treated at 2400° C.) with, and without, surfactant. Carbon spheres heat-treated at 2400° C. provided excellent wear-resistance compared to carbon spheres heat-treated at 700° C. thereby indicating the benefit of heating the carbon spheres to significantly high temperatures (2000-3000° C.) prior to use. Addition of the STO surfactant to the carbon sphere-based lubricant significantly improved the dispersibility of the carbon spheres; it also further improved the friction properties of the carbon sphere-based lubricant composition.

Example 10

Figure 10:
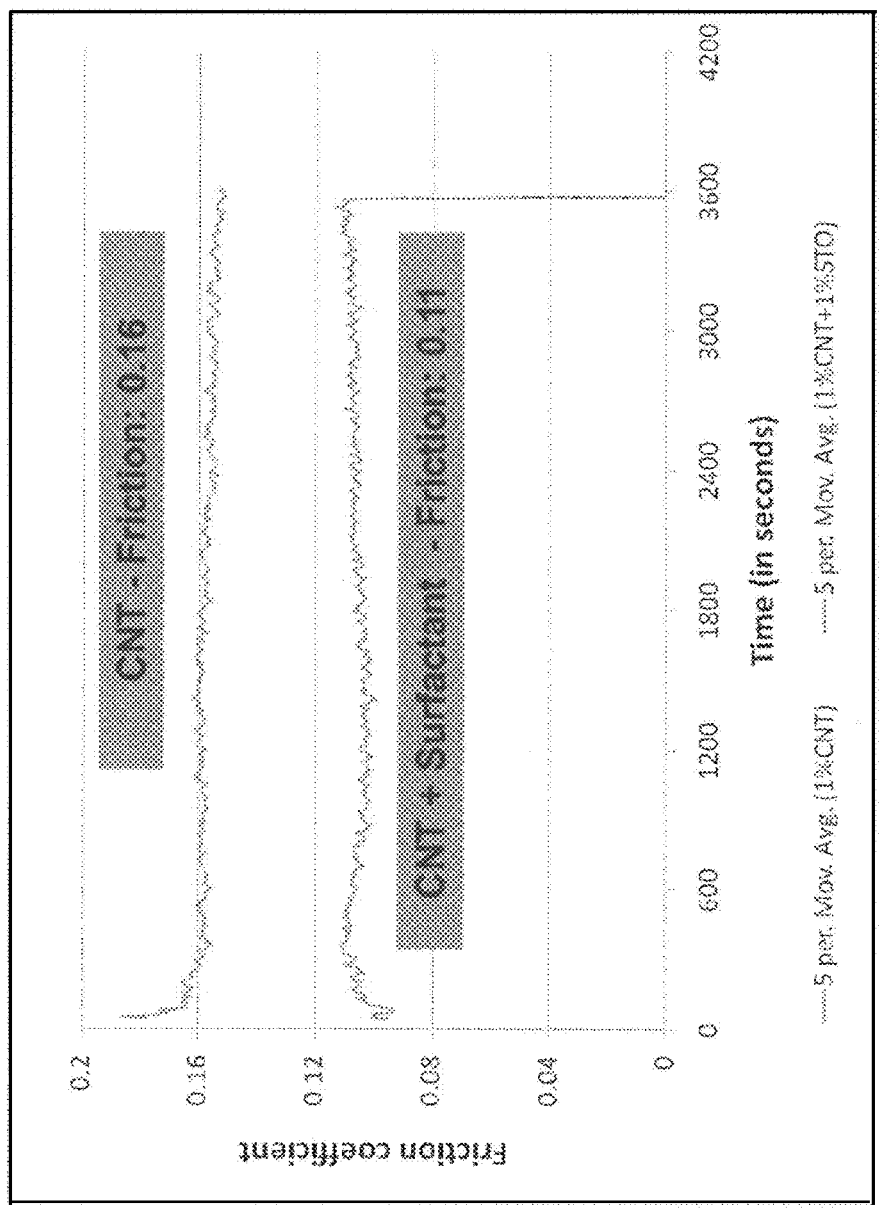
FIG. 10 illustrates improved friction performance of a carbon fiber-containing lubricant with the addition of surfactant. The friction coefficient is reduced by more than 30% with improved wear resistance.

Although the carbon materials produced by autogenic reactions offered excellent tribological performance, there are several ways to optimize their properties even further. Treatment of particles with surfactants did influence the surface chemistry of these particles and hence their interactions with sliding surfaces. In particular, the addition of polar surfactants into the carrier oils improved the interaction of the particles. Sorbitan trioleate (STO), provided a very desirable performance (FIG. 9, FIG. 10 and FIG. 11). When STO was added to the carbon particle-containing blends, the friction was reduced by 30%. The reason for this good performance may be attributed to the hydrophilic sorbitan portion of the STO surfactant enhancing the interaction of the carbon particles with the steel surfaces, and keeping the particles uniformly dispersed in the base oils. The hydrophobic oleate portion of the molecule likely participates in the tribochemical reaction along with carbon particles and forms durable boundary films on the sliding surfaces.

Figure 12:
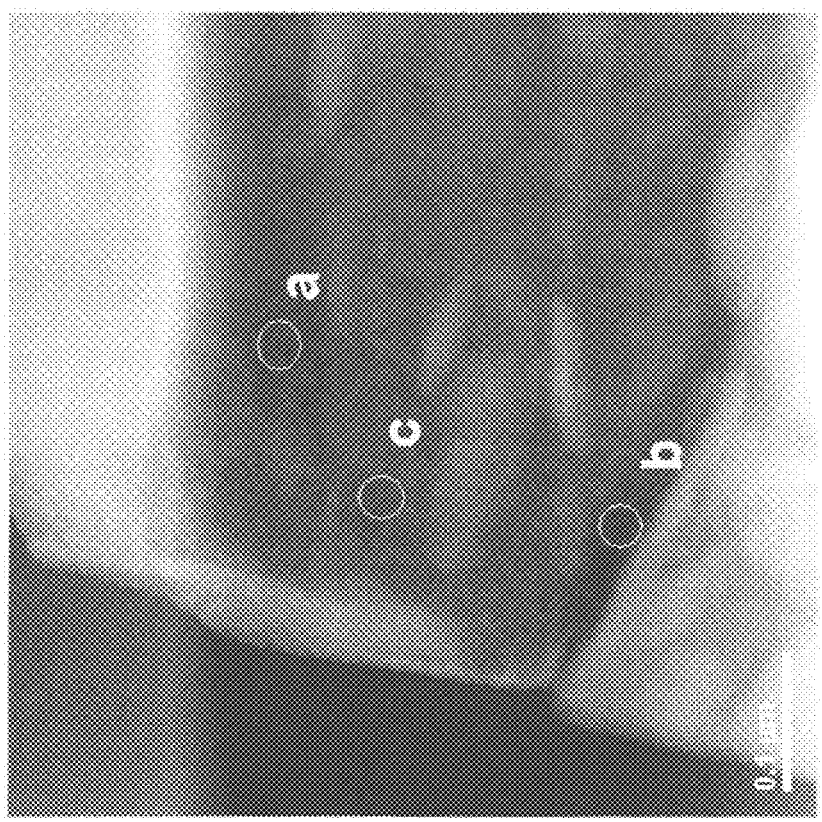
FIG. 12 illustrates a reaction film observed on the steel surface when tested with a carbon sphere-containing lubricant and sorbitan trioleate surfactant. The reaction film was carefully cross-sectioned using a Focused Ion Beam (FIB) method and observed with a transmission electron microscope. Points a, b, c confirm the presence of a carbon rich species in those areas.

A high resolution transmission electron microscopy image in cross-section, using the Focused Ion Beam (FIB) technique, of the reaction or boundary film resulting from the reaction of the carbon spheres with the STO-MO surfactant is shown in FIG. 12. The reaction or boundary film looks rather thick, featureless and discreet on the steel surface. The reaction film was distinctly darker in color, suggesting that the film was carbon-rich due to carbon sphere interaction. Moreover, the reaction film was more than 200 nm thick, suggesting very robust processes that lead to the formation of such reaction films. Thus, it appears that the addition of the STO surfactant to the carbon sphere-based lubricant provides excellent tribological performance due to the enhanced interaction of the lubricant with the sliding surface to form a highly durable and protective boundary film.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. It is also understood that additional improvements in the friction and wear properties of the carbon-based lubricant additives of the invention can be expected to be made in the future by improving and optimizing the autogenic processing techniques and conditions whereby the materials are fabricated.

The embodiments of the invention in which an exclusive property or privilege is claimed are defined as follows:

1. A lubricant composition comprising carbon particles suspended in a liquid hydrocarbon carrier; wherein the carbon particles are prepared by heating neat, high or low density polyethylene in a sealed reactor at a temperature in the range of at least about 700° C. and under an autogenic, self generated pressure in the range of about 800 to about 2000 pounds-per-square inch (psi), subsequently cooling the reactor to less than 100° C. and isolating the resulting particulate carbon material from the reactor; wherein the carbon particles are generally spherical in shape, not hollow, and have an average diameter in the range of about 1 to about 5 micrometers; wherein the liquid hydrocarbon carrier comprises a poly(alpha olefin) and the carbon particles are present in the composition at a concentration in the range of about 0.5 to about 1 wt %.

2. The lubricant composition of claim 1 further comprising a surfactant.

3. The lubricant composition of claim 2 wherein the surfactant comprises a non-ionic surfactant.

4. The lubricant composition of claim 2 wherein the surfactant comprises sorbitan trioleate.

5. The lubricant composition of claim 2 wherein the surfactant is present in the composition at a concentration in the range of about 1000 to about 20000 parts-per-million (ppm).

6. The lubricant composition of claim 1 wherein the carbon particles have been heat-treated under an inert atmosphere at a temperature in the range of about 1000 to about 3000° C. prior to suspending in the liquid hydrocarbon carrier, and the carbon particles have a density of about 2.1 grams-per-cubic centimeter (g/cc).

* * * * *